United States Patent [19]
Kahr et al.

[11] Patent Number: 5,388,675
[45] Date of Patent: Feb. 14, 1995

[54] BACKING PLATE FOR DISC BRAKE PAD

[75] Inventors: Joseph C. Kahr, Southern Pines; Keith D. Conrad, Aberdeen, both of N.C.

[73] Assignee: Westinghouse Air Brake Company, Wilmerding, Pa.

[21] Appl. No.: 263,989

[22] Filed: Jun. 23, 1994

[51] Int. Cl.⁶ .................................................. F16D 65/08
[52] U.S. Cl. ............................. 188/250 B; 188/250 G
[58] Field of Search ............... 188/234, 250 R, 250 D, 188/250 E, 250 F, 250 G, 250 B, 73.31, 73.32, 73.37; 192/70.15, 107 R

[56] References Cited

U.S. PATENT DOCUMENTS 4,508,199  4/1985  Herbulot et al. ............... 188/250 B
4,552,252  11/1985  Stahl ............................. 188/250 B

FOREIGN PATENT DOCUMENTS 2611012  8/1988  France ............................ 188/250 B
2132293  7/1984  United Kingdom ............ 188/250 B

*Primary Examiner*—Robert J. Oberleitner
*Assistant Examiner*—Chris Schwartz
*Attorney, Agent, or Firm*—Gary J. Falce

[57] ABSTRACT

An improved disc brake pad backing plate assemblage of the dovetail type wherein dovetail end strength for resisting deformation is increased by the use of a special secondary backing plate member in conjunction with a primary backing plate member having a dovetail for mating engagement with the dovetail groove in a disc brake holder. The resultant absence of dovetail end deformation facilitates removal of the disc brake pad from the mating dovetail groove.

15 Claims, 3 Drawing Sheets

BACKING PLATE FOR DISC BRAKE PAD

BACKGROUND OF THE INVENTION

The present invention is related to brake pads for disc brakes and in particular to the mounting arrangement therefore.

Disc brake pads that are adapted for use in certain railroad installations employ a dovetail configured backing plate via which the brake pad is affixed to a brake shoe holder having a corresponding dovetail shaped groove to receive the backing plate dovetail. This dovetail groove has a generally vertical orientation in the brake shoe holder, which allows the backing plate dovetail to be installed from the bottom until its forward or upper end engages the adjacent closed upper end of the dovetail groove. Various type locking pins or clasp arrangements are utilized to close the bottom opening of the dovetail groove following brake pad installation in order to prevent the brake pad from falling out during service and to accommodate removal during changeout of worn or damaged brake pads.

The backing plate is made of thin steel sheet stock, which is well-suited for forming the dovetail-shaped tongue by a stamping/forming operation. While the thin steel sheet makes possible a cost-effective means of forming the dovetail-shaped backing plate, deformation of the dovetail has been found to occur in actual service at its upper or forward end. This deformation results from the running vibration of the railroad car, which is transferred to the vertically oriented disc pad, and in turn causes the upper end of the backing plate dovetail to vibrate against the upper end of the dovetail groove. This repetitive impingement of the dovetail upper end causes the end to be peened into the dovetail groove. Consequently, when brake pad removal or change-out is required, interference between the peened end of the dovetail and the dovetail groove makes it difficult and time consuming to remove the brake disc which is intended to be accomplished by simply sliding the backing plate dovetail out of the dovetail groove.

SUMMARY OF THE INVENTION

It is an object of the present invention to provide a disc brake pad having an improved dovetail-type backing plate arrangement capable of resisting deformation due to vibratory impingement with the end of the complementary dovetail groove in the brake pad holder without departing from the concept of a low-cost stamped process of forming the backing plate.

In accordance with the foregoing, there is provided a disc brake pad including a friction brake lining and a novel backing plate assemblage to which the brake lining is attached. The backing plate assemblage is a type having a dovetail-shaped tongue for interlocking connection with a corresponding dovetail-shaped groove in a brake holder of the disc brake pad and comprises primary and secondary backing plate components that are interconnected in a unitary backing plate assemblage. The primary backing plate is formed with an elongated, dovetail-shaped tongue having a channel within which at least one upraised tab of the secondary backing plate is positioned so as to be spot welded or otherwise affixed to the dovetail tongue of the primary backing plate, thereby inhibiting deformation of the dovetail end into the dovetail groove.

BRIEF DESCRIPTION OF THE DRAWINGS

This and other objects and advantages of the present invention will become apparent from the following more detailed explanation when taken in conjunction with the accompanying drawings in which.

DESCRIPTION AND OPERATION

Figure 1:
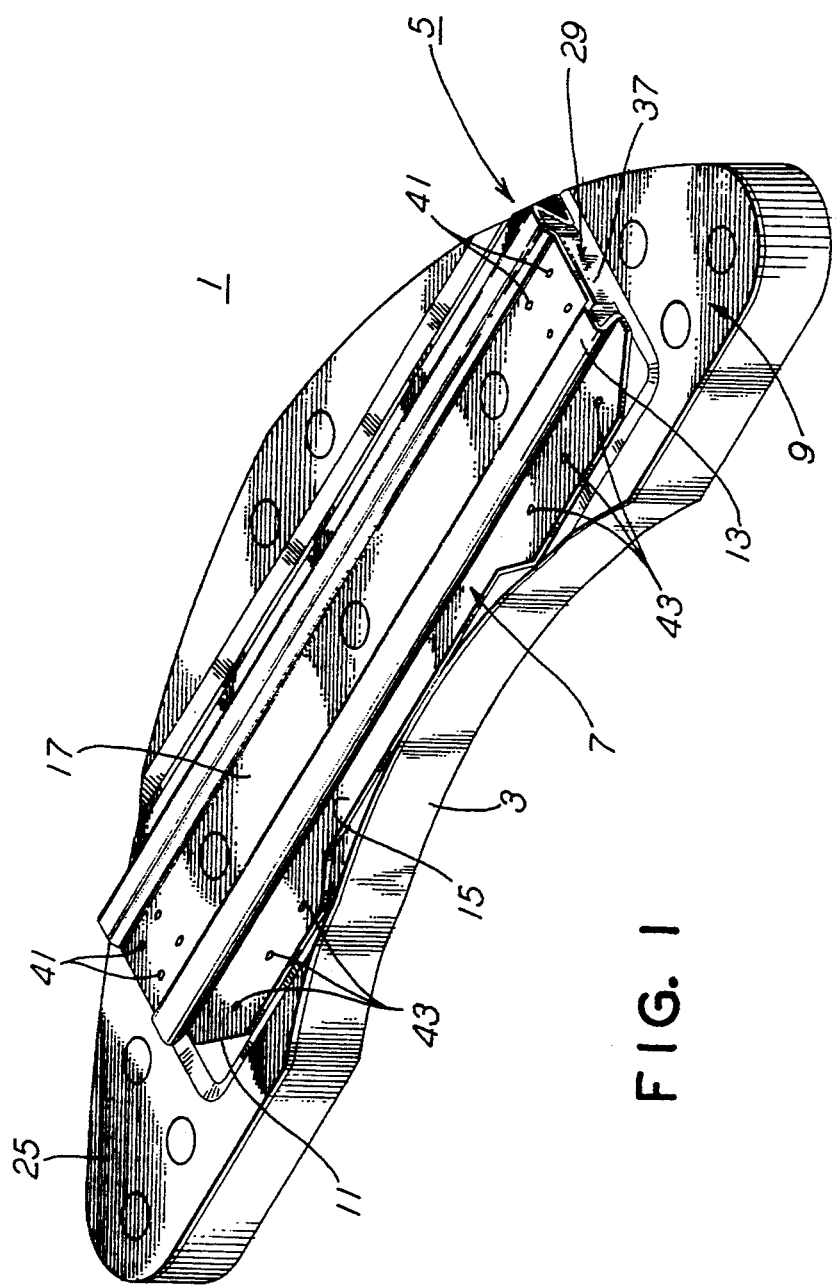
FIG. 1 is an isometric view showing a disc brake pad affixed to a backing plate assemblage according to the present invention.

Referring to FIG. 1, there is shown a disc brake pad 1 comprising a brake lining 3 and a backing plate assemblage 5 to which the brake lining 3 is bonded. Backing plate assemblage 5 includes a primary backing plate 7 and a secondary backing plate 9 that are mechanically fixed together in a unitary structure.

Figure 2:
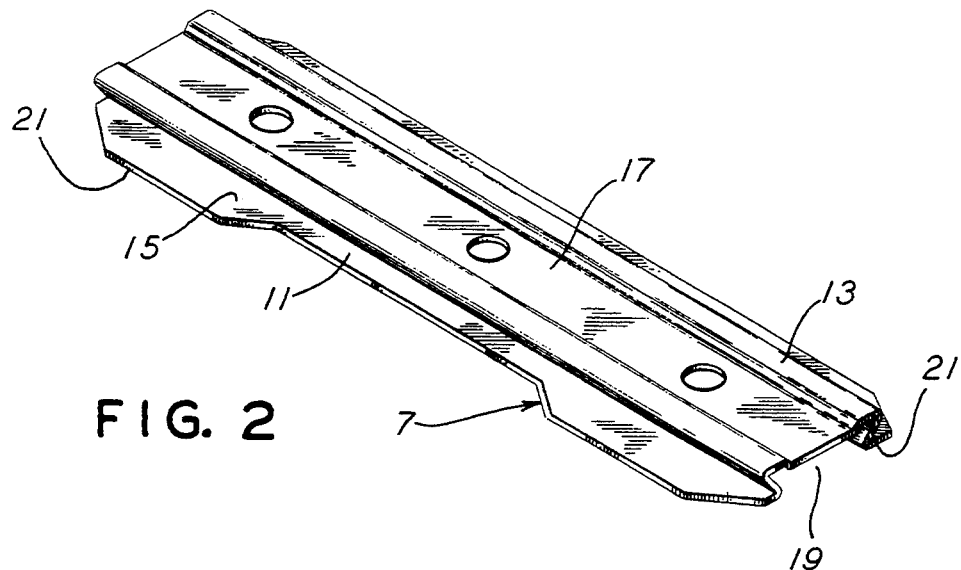
FIG. 2 is an isometric view of a primary backing plate of the backing plate assemblage of FIG. 1.

Primary backing plate 7 shown in FIG. 2 is formed from a base plate 11 of thin gage, steel sheet stock that affords ease of stamping and forming, whereby a tongue 13 is displaced from the plane of base plate 11, so as to be upraised from the upper side 15 thereof. This upraised tongue is dovetail-shaped in cross-section and extends the full length of primary backing plate 7. The gage of the dovetail configured tongue 13 is essentially the same as the thin gage base plate 11 and to this extent corresponds generally to the dovetail type backing plates presently known in the art, which are prone to deformation failure, specifically at the upper end adjacent the dovetail groove end in the brake pad holder, as previously discussed.

In accordance with one aspect of the present invention, the upper dovetail surface of tongue 13 is formed with an elongated recess 17 that projects into a channel 19 formed by the dovetail-shaped configuration of tongue 13. Channel 19 opens to the under side 21 of base plate 11 and runs the full length of the primary backing plate. Generally, recess 17 is formed to lie midway between the longitudinal sides of the dovetail-shaped tongue 13, the purpose of recess 17 being to impart greater strength to the dovetail tongue to resist deformation.

Figure 3:
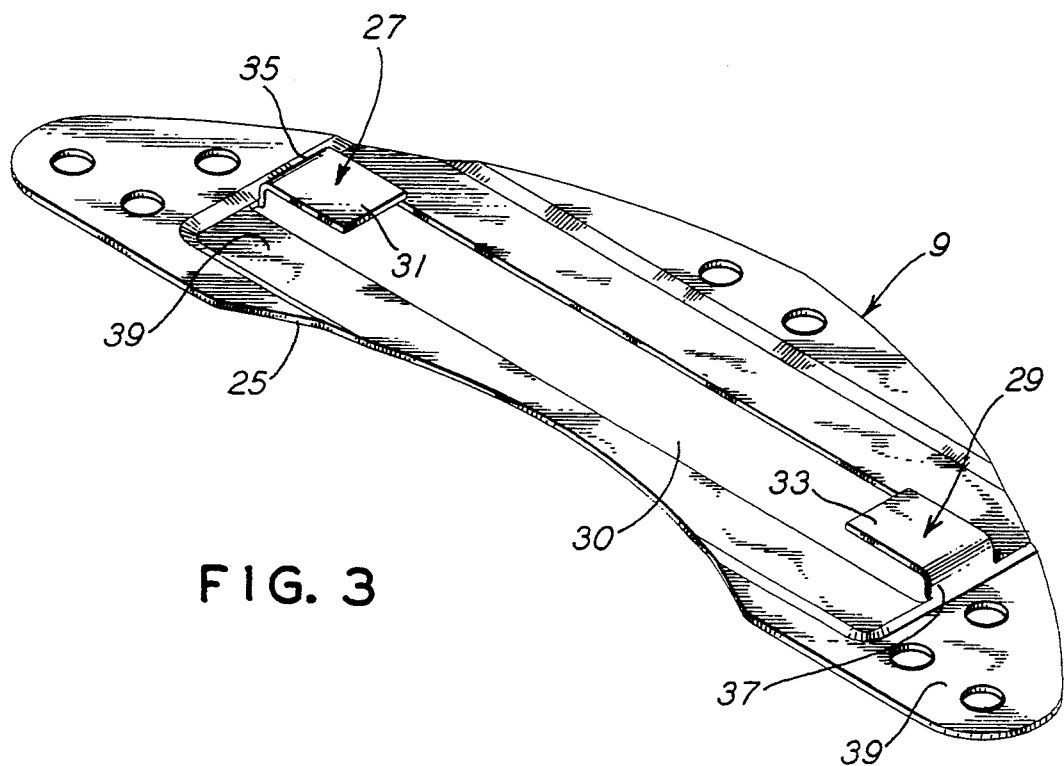
FIG. 3 is an isometric view of a secondary backing plate employed in the backing plate assemblage of FIG. 1.
Figure 6:
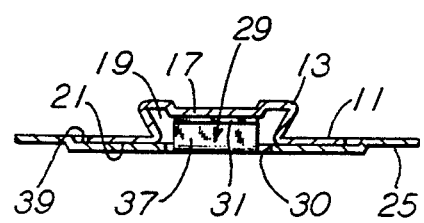
FIG. 6 is a section view taken along the lines 6—6 in FIG. 4.

Secondary backing plate 9 shown in FIG. 3 is also formed from a base plate 25 of thin gage, steel sheet stock, which is stamped and formed to provide a pair of upraised tabs 27, 29 that are integral with base plate 25. These tabs are displaced from the plane of base plate 25, thereby leaving an elongated opening 30 in base plate 25 of secondary backing plate 9. Opening 30 conforms generally to the shape of the opening of channel 17 in the underside of primary backing plate 7, as best seen in FIG. 6 and provides access through which the friction composition material flows during molding of the brake lining 3. This provides for complete filling of the cavities within the backing plate assemblage to maximize bonding strength in securing the brake lining to the backing plate assemblage, and to reinforce tabs 27, 29.

Figure 4:
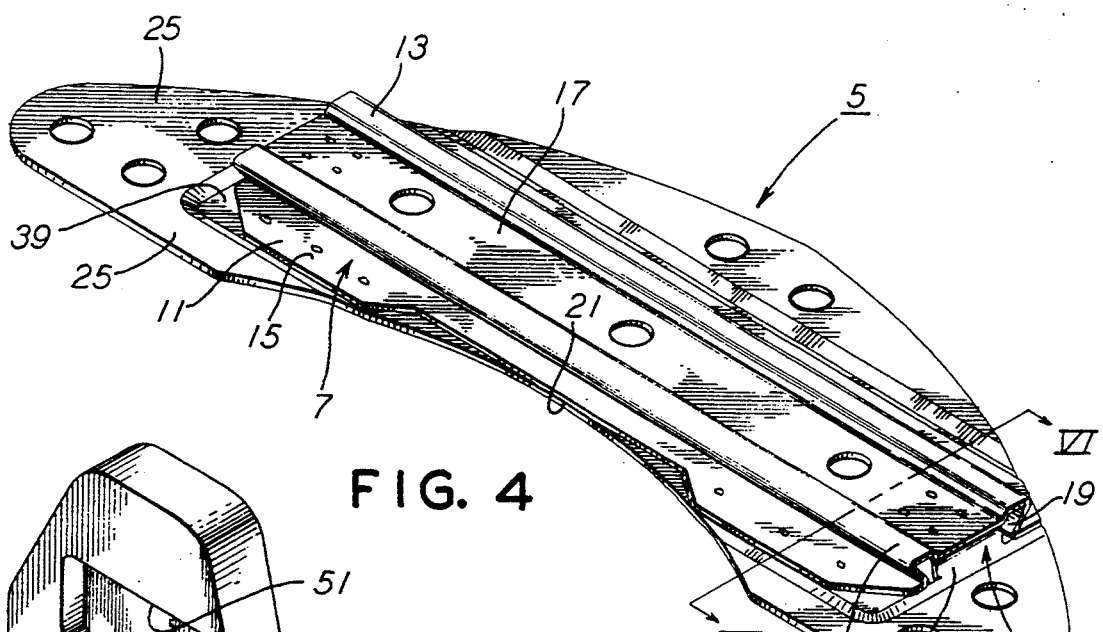
FIG. 4 is an isometric view of the backing plate assemblage of FIG. 1.

The respective tabs 27, 29 each comprise an upraised support plate 31, 33 and an end wall 35, 37 interconnected between support plate 31, 33 and base plate 25 so as to be substantially normal thereto, support plate 31, 33 being substantially parallel with base plate 25. The height that support plate 31, 33 of the respective tabs is upraised from base plate 25 corresponds generally to the depth of channel 17 between base plate 11 and recess 17. Thus, when the primary and secondary backing plates are fit together with underside 21 of base plate 11 engaging the upper side 39 of base plate 25, as shown in FIG. 4, the respective support plates 31, 33 of tabs 27, 29 are disposed within channel 19 in engagement with the dovetail recess 17 of tongue 13. Tabs 27, 29 are located so that support plates 31, 33 engage recessed tongue 17 at its respective opposite ends, where the dovetail surface tends to become peened during service. Preferably, tongue 13 is affixed to support plates 31, 33, as by spot welds 41, which prevent the tongue end from being peened away from its support plate.

The base plates 11, 25 of the respective primary and secondary backing plates 7, 9 are also fastened together by spot welds 43 around the periphery of the base plates. Accordingly, the primary and secondary backing plates are secured together to form backing plate assemblage 5. The respective end walls 35, 37 of tabs 27, 29 are aligned generally with the very ends of dovetail-shaped tongue 13 in order to provide maximum reinforcement of support plates 31, 33 in this most critical area of deformation. Moreover, the aforementioned location of the end walls 35, 37 relative to the ends of dovetail-shaped tongue 13 closes the major portion of the open ends of the dovetail channel 19. Being flush with the ends of the dovetail tongue 13, end walls 35, 37 provide a greater abutment surface to increase the impact area of the backing plate assemblage 5, which thereby reduces the tendency of the dovetail tongue end to become peened.

The friction brake lining 3 is secured to backing plate assemblage 5 by a molding process in which the secondary backing plate 9 has the lining 3 bonded to the underside of base plate 25 thereof. During such bonding, the friction brake lining material flows through opening 30 in base plate 25 and fills the dovetail channel 19 between the ends of tongue 13 formed by end walls 35, 37, including the area around support plates 31, 33. Thus, the friction brake lining material is provided with an increased area for bonding, particularly in the vicinity of the ends of the dovetail tongue 13 where the greatest impact stress occurs and by virtue of this bonding establishes a structural reinforcement of the end walls 35 and 37.

Figure 5:
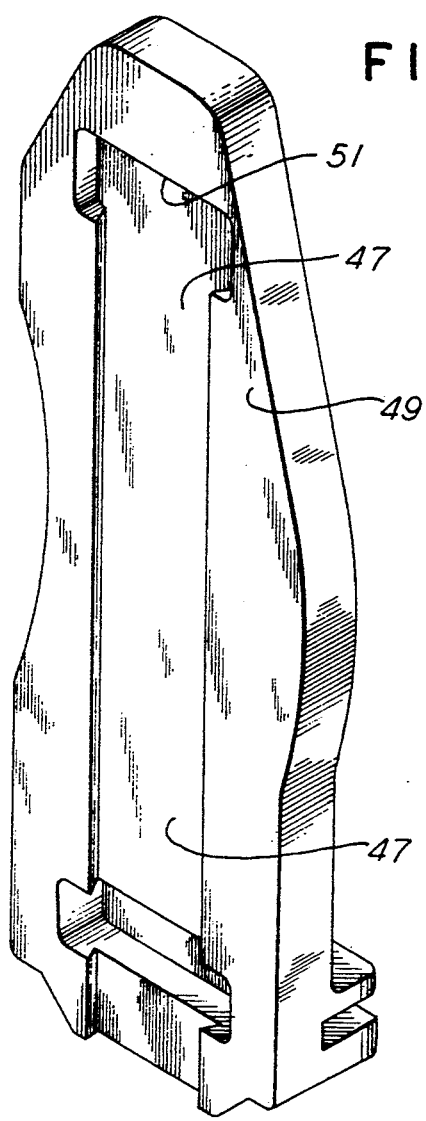
FIG. 5 is an isometric view of a disc brake shoe holder adapted for tongue and groove assembly of a disc brake pad.

In operation, dovetail-shaped tongue 13 of brake pad 1 is adapted to engage a correspondingly shaped dovetail groove 47 in a brake pad holder 49, as shown in FIG. 5. This dovetail-shaped tongue and groove configuration allows the brake pad to be installed by sliding the backing plate assemblage 5 vertically into interlocking engagement with groove 47 in brake pad holder 49 and similarly withdrawing the brake pad therefrom for application of new brake pads and removal of worn brake pads, respectively, in a well-known manner.

With brake pad 1 installed, the upper end of dovetail tongue 13 including the face of end wall 37 is contiguous with a closed upper end 51 of dovetail groove 49. In that the face of end wall 37 is flush with the dovetail tongue end, the tongue end is formed as a quasi-solid end member reinforced by the filling of friction material, thus providing greater impact resistance against vibratory impingement of backing plate assemblage 5 with dovetail groove end 51 during running of a railroad car employing the brake pad 1 of the present invention.

Further, should such vibratory impingement still tend to peen the dovetail end, such peening of the dovetail tongue end into dovetail groove 47 will be prevented by reason of the fixed attachment of the dovetail tongue 13 with the support plate 29 adjacent groove end 51, and the strengthening recess 17 in dovetail tongue 13.

I claim:

1. A disc brake pad including a block of friction brake lining and a backing plate assemblage to which said block of friction brake lining is affixed, said backing plate assemblage having an elongated dovetail-shaped tongue for interconnection with a corresponding dovetail-shaped groove in a brake holder in which said disc brake pad is removably secured, said backing plate assemblage comprising:
   a) A primary backing plate including a first elongated base plate on one side of which is formed a longitudinal tongue having a dovetail-shaped cross-section said tongue being formed with a channel that opens into a side of said base plate opposite said one side;
   b) a secondary backing plate including a second base plate on one side of which is affixed said block of friction brake lining and on the other side of which is formed at least one tab that is upraised from said second base plate and projects into said channel proximate at least one end of said longitudinal tongue when said opposite side of said primary backing plate is engaged with said one side of said secondary backing plate; and
   c) first securing means for interconnecting said tongue to said at least one tab.

2. A disc brake pad as recited in claim 1, wherein said longitudinal tongue is formed with a recess projecting into said channel.

3. A disc brake pad as recited in claim 2, wherein said first securing means comprises a plurality of spot welds for interconnecting said tongue to said at least one tab at said recess.

4. A disc brake pad as recited in claim 3, wherein said at least one tab comprises:
   a) a support plate substantially parallel to the plane of said second base plate in spaced-apart relationship therewith; and
   b) an end wall interconnected between said support plate and said second base plate.

5. A disc brake pad as recited in claim 4, wherein said support plate and said end wall are formed integral with said second base plate, being displaced from the plane thereof to provide an elongated opening in said second base plate corresponding in size and shape with said channel and aligned generally with said channel when said first and second base plates are interconnected, the friction material of said brake lining filling said channel via said opening when said friction brake lining is formed by a molding process for bonding to said backing plate assemblage.

6. A disc brake pad as recited in claim 5, wherein said at least one tab is formed at said at least one end of said elongated opening, said end wall of said at least one tab being flush with the corresponding end of said tongue within said channel thereof.

7. A disc brake pad as recited in claim 6, wherein said at least one tab is a first tab formed at one end of said elongated opening and a second tab formed at another end of said elongated opening, said first and second tabs being spaced-apart in the direction of elongation of said opening.

8. A disc brake pad as recited in claim 7, wherein said support plate of said first and said second tab is secured to said tongue at said recess therein by said plurality of spot welds.

9. A disc brake pad as recited in claim 6, wherein said support plate of said at least one tab is secured to said tongue at said recess therein by said plurality of spot welds.

10. A disc brake pad as recited in claim 4, wherein said support plate of said at least one tab is interconnected to said tongue at said recess therein by said plurality of spot welds.

11. A disc brake pad as recited in claim 10, wherein the width of said support plate and the width of said end wall correspond generally to the width of said recess.

12. A disc brake pad as recited in claim 11, wherein the width of said support plate is less than the width of said channel opening into said opposite side of said first base plate.

13. A disc brake pad as recited in claim 1, further comprising second securing means for interconnecting said primary and secondary backing plates together at said first and second base plates thereof.

14. A disc brake pad as recited in claim 3, wherein said second securing means comprises a plurality of spot welds.

15. A disc brake pad as recited in claim 1, wherein said first securing means comprises at least one spot weld.

* * * * *